United States Patent [19]

King

[11] 4,307,573

[45] Dec. 29, 1981

[54] THERMAL-CYCLE ENGINE

[76] Inventor: William L. King, 85232 Winding Way, Pleasant Hill, Oreg. 97401

[21] Appl. No.: 901,356

[22] Filed: May 1, 1978

Related U.S. Application Data

[63] Continuation-in-part of Ser. No. 868,499, Jan. 11, 1978, abandoned.

[51] Int. Cl.³ ............................................. F01K 11/02
[52] U.S. Cl. ..................................... 60/669; 60/641.6; 60/693; 165/92; 165/125
[58] Field of Search ................. 60/641, 651, 669, 671, 60/676, 693, 641 G; 62/499; 165/92, 125, 86

[56] References Cited

U.S. PATENT DOCUMENTS

| | | | |
|---|---|---|---|
| 869,453 | 10/1907 | Otis | 60/676 |
| 1,557,557 | 10/1925 | Chaussepied | 60/669 |
| 1,804,694 | 5/1931 | Jones | 60/651 X |
| 2,075,648 | 3/1937 | Huttner | 60/669 |
| 3,349,247 | 10/1967 | Birkestrand | 60/669 X |
| 3,613,368 | 10/1971 | Doerner | 60/669 X |
| 3,861,148 | 1/1975 | Bailey et al. | 60/671 X |
| 3,996,477 | 12/1976 | Laing | 60/669 X |
| 4,009,576 | 3/1977 | Doerner et al. | 60/670 |

FOREIGN PATENT DOCUMENTS 670685  1/1939  Fed. Rep. of Germany ........ 60/669

*Primary Examiner*—Allen M. Ostrager
*Assistant Examiner*—Stephen F. Husar
*Attorney, Agent, or Firm*—Klarquist, Sparkman, Campbell, Leigh, Whinston & Dellett

[57] ABSTRACT

A comparatively low heat differential is utilized for energy generation wherein flow of a fluid from a low temperature reservoir to a high temperature reservoir is maintained by the weight of the fluid, for example through utilization of centrifugal force provided as the vaporized fluid from the high temperature reservoir operates a gas turbine. Evaporation cooling is preferably employed in establishing the temperature differential.

28 Claims, 9 Drawing Figures

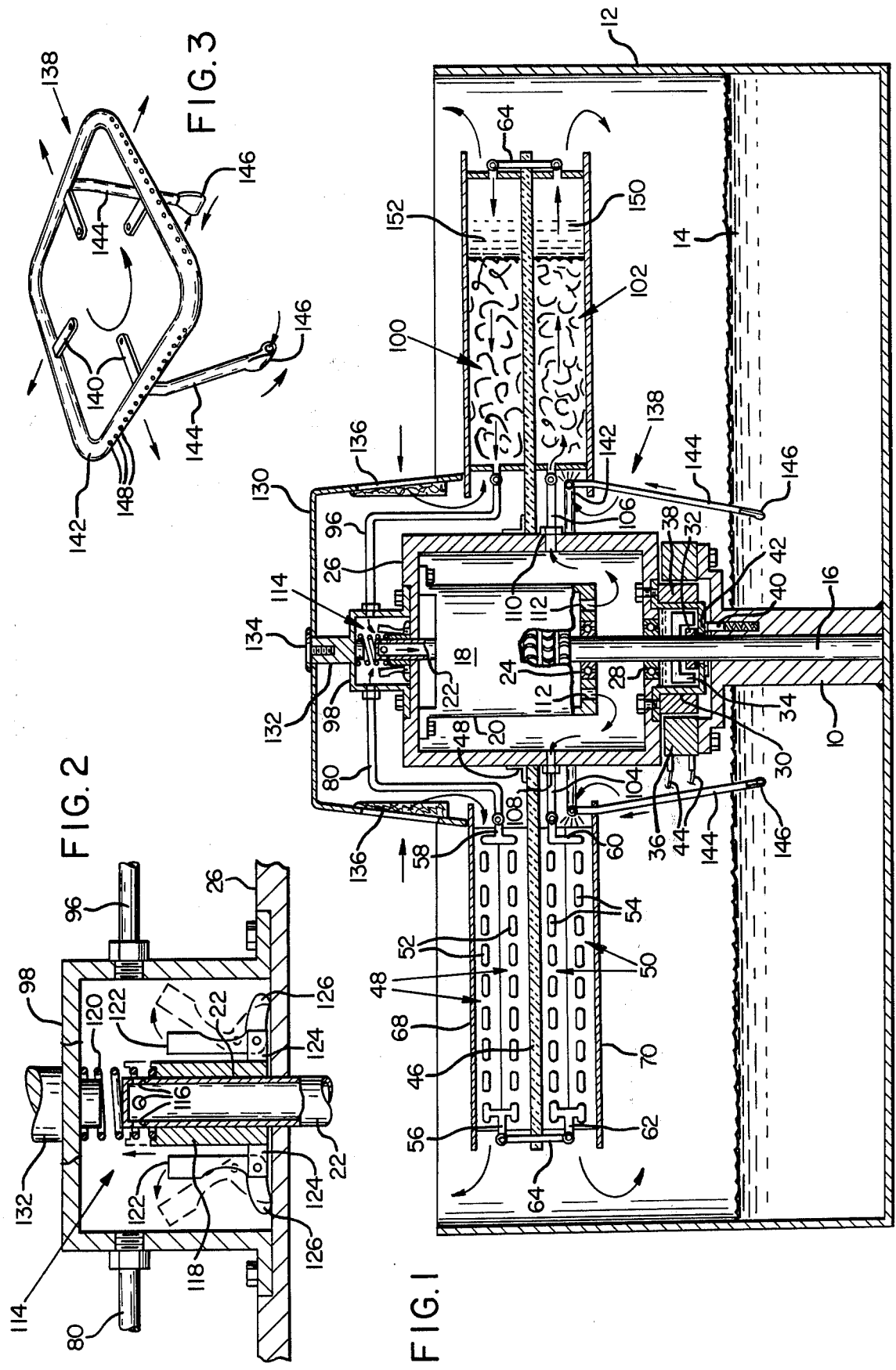

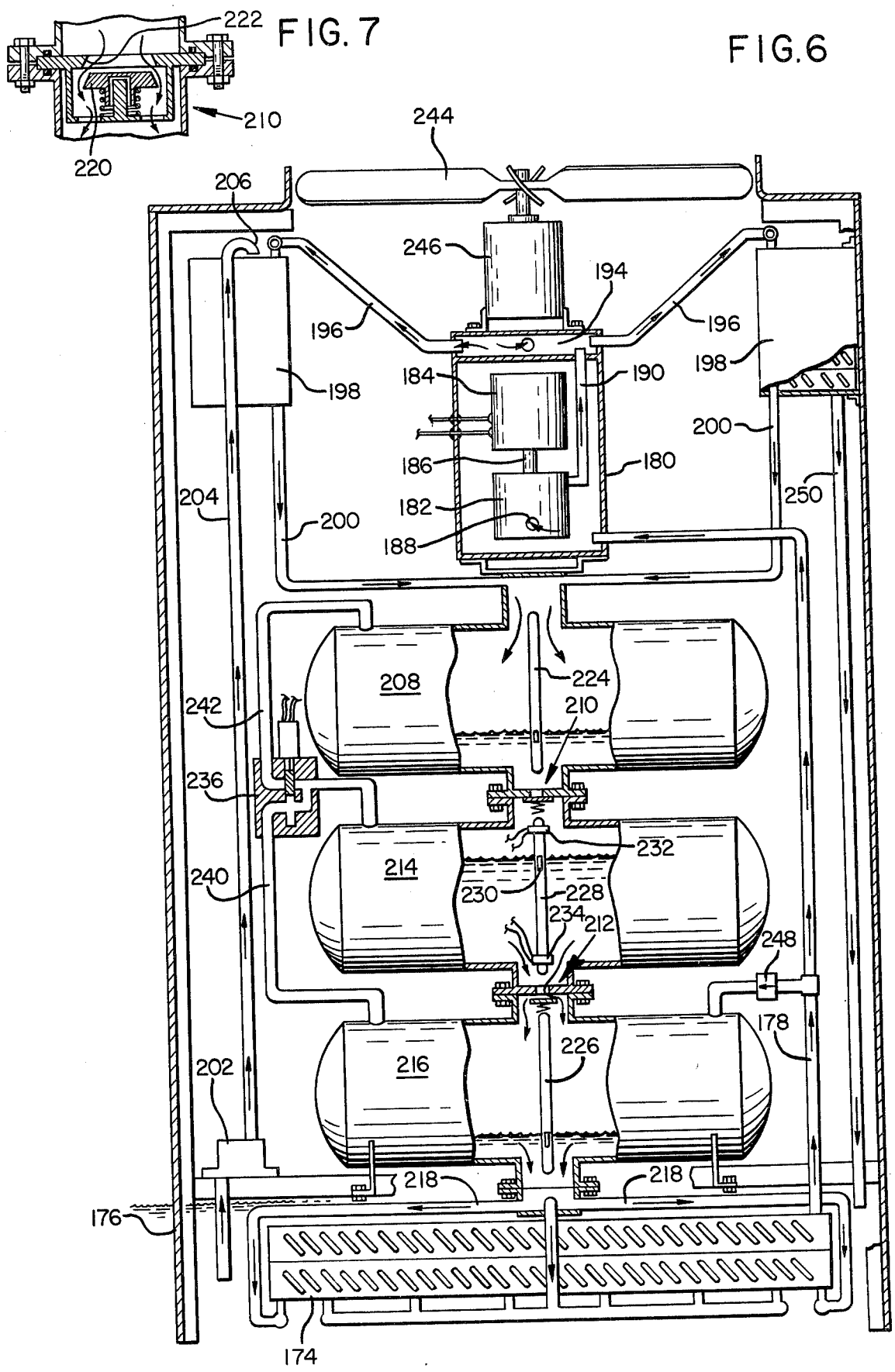

THERMAL-CYCLE ENGINE

BACKGROUND OF THE INVENTION

This application is a continuation-in-part of my co-pending application Ser. No. 868,499 filed Jan. 11, 1978, now abandoned.

This invention relates to an improved thermalcycle engine, and particularly to such engine for converting a relatively low-grade heat differential into usable energy.

Generation of electrical energy by means of bi-thermal liquid vapor cycle generators is known and research has been conducted to develop a system for converting low-grade heat content in our environment by this process into usable electrical energy. The latent heat surrounding us is recharged every day by the sun. This indirect solar energy is clean and convenient, and has an unending potential for our total energy needs. However, recognizing that our environment has this potential has not been the problem. The real problem lies in the fact that science and technological research has not heretofore developed a suitable chemical or mechanical process whereby this energy can be rapidly converted.

The relatively low temperature differential usually available in the environment makes energy conversion more difficult than in a case of where high temperature differentials are available, for example, as encountered in a conventional steam power plant. The energy consuming equipment utilized in a conventional Rankine cycle type of apparatus doom similar apparatus to failure at lower temperature levels because the power required to operate the system may exceed the power output produced.

SUMMARY OF THE INVENTION

In accordance with the present invention, a thermal-cycle engine converts a comparatively low-grade heat differential into usable wherein the flow of a fluid from a low temperature reservoir to a high temperature reservoir is maintained by the weight of the fluid, e.g. in one embodiment through the utilization of centrifugal force provided through operation of a gas turbine operated by vaporized fluid from the high temperature reservoir. A high fluid flow is produced between condensers at the low temperature level and evaporators at the high temperature level, resulting in appreciable heat transfer. In preferred embodiments, the turbine causes rotation of a combination of condensers operating at the low temperature and eveporators operating at the high temperature, with fins of these devices operating as fan blades to produce rapid air movement. Evaporation cooling is preferably employed at the condensers in establishing or enhancing the temperature differential. No valving, pumps nor fans in a conventional sense need be employed, and bearings are kept to a minimum resulting in a net production of energy from the environment rather than a net loss. The centrifugal force action in the preferred embodiments produces a high velocity fluid flow with a comparatively low total volume of fluid in the system.

It is accordingly an object of the present invention to provide an improved thermal-cycle engine for converting a comparatively low-grade heat differential into usable energy.

It is another object of the present invention to provide an improved thermal-cycle engine of increased efficiency.

It is a further object of the present invention to provide an improved thermal-cycle engine utilizing a minimum of auxiliary equipment and having few losses.

It is another object of the present invention to provide an improved thermal-cycle engine which is economical in construction and conveniently utilizable for generating power at almost any location.

The subject matter which I regard as my invention is particularly pointed out and distinctly claimed in the concluding portion of this specification. The invention, however, both as to organization and method of operation, together with further advantages and objects thereof, may best be understood by reference to the following description taken in conjunction with the accompanying drawings wherein like reference characters refer to like elements.

DRAWINGS

FIG. 1 is a vertical cross-sectional view of a first embodiment according to the present invention;

FIG. 2 is a coss-sectional view of a governor portion of the FIG. 1 embodiment;

FIG. 3 is a perspective view of a water pickup device utilized in the FIG. 1 embodiment;

FIG. 6 is a vertical cross-sectional view of a third embodiment according to the present invention;

FIG. 7 is a vertical cross-sectional view, partially broken away, of a valve portion of the FIG. 6 embodiment;

DETAILED DESCRIPTION

Figure 4:
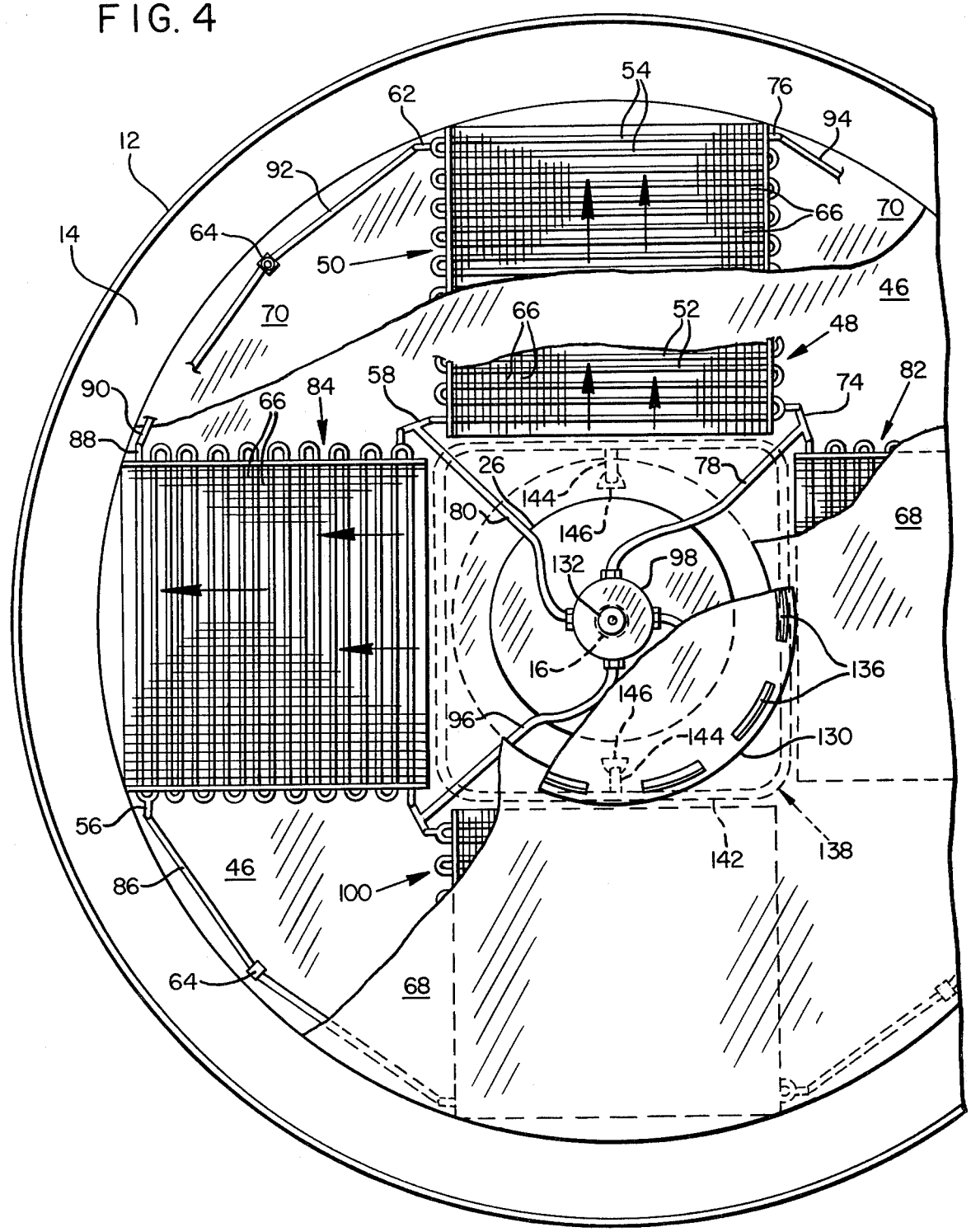
FIG. 4 is a horizontal cross-sectional view, partially broken away, of the FIG. 1 embodiment.

Referring to FIGS. 1 through 4 illustrating a first preferred embodiment of the present invention, a standard 10 is supportably affixed to the bottom of a reservoir tank 12 containing a quantity of water 14. The standard 10 vertically receives central shaft 16 of a gas turbine 18 and supports said shaft in fixed relation such that the turbine blades which ordinarily rotate are in this case fixed, while the exterior casing 20 carrying the ordinarily fixed turbine blades will rotate. Thus, as the result of gas under pressure supplied to intake tube 22, the turbine casing 20 rotates upon bearings 24. The turbine 18 is suitably a small turbine of the type employed to provide auxiliary or standby power on aircraft. Alternatively, an air motor or similar device may be substituted for producing rotary motion in response to gas pressure.

The turbine casing is affixed to a surrounding, gas tight cylindrical enclosure 26 into which tube 22 passes and from which turbine shaft 16 extends through bearings 28. Attached to the lower end of enclosure 26 in surrounding relation to shaft 16 is an oil seal cup 30 carrying a quantity of oil above a high pressure seal 32 around the shaft. Stationary fan blades 34 affixed to shaft 16 aid in preventing the oil from moving away from the seal to too great an extent when the apparatus rotates.

Standard 10 also supports the stator coils 36 of an electrical generator, the rotor coils 38 of which are secured to the exterior of the oil seal cup. A brush 40 contacts a slip ring 42 located on the bottom of the oil seal cup and connected to excite the rotor or field winding 38. The electrical return is made through ground. Generator leads 44 connect the stator coils to the electrical load.

Midway along the exterior of cylindrical enclosure 26 is secured a large diameter disk 46 by means of angle flange 49. The disk 46 which is suitably four to five feet in diameter comprises a thermal barrier of insulating material, for instance fiber glass, and carries a plurality of evaporators 48 on an upper side and a plurality of condensers 50 secured to its lower side. As illustrated at the left in FIG. 1, a pair of evaporators disposed one on top of the other include fluid carrying tubing 52, while a pair of condensers also disposed on top of one another include fluid carrying tubing 54. The evaporators 48 are provided with a common inlet 56 and a common outlet 58, and similarly the condensers 50 are provided with a common inlet 60 and a common outlet 62. The outlet 62 of the condensers is connected to evaporator inlet 56 via peripheral connection 64. Each of the condenser and evaporator devices suitably comprises a commonly available refrigeration condenser unit having the re-entrant tubing thereof intersecting a multiplicity of metal, heat conducting fins 66 whereby the fluid within the tubing readily exchanges heat with the atmosphere or other substance surrounding the fins. An upper annular disk plate 68 is secured to the upper evaporator 48 while a lower annular disk plate 70 is similarly secured to the lower condenser 50. Disk plates 68 and 70 are suitably formed of metal and act to channel the passage of air through the respective evaporators and condensers in connection with disk 46. It is noted the fins 66 are in general radial to the device and define air passages therebetween and between disk 46 and plates 68 and 70.

As can be seen in FIG. 4, the construction illustrated at the left-hand side of FIG. 1 is repeated four times around the center of the apparatus and each condenser or evaporator unit has inlet and outlet connections on both sides thereof. Thus, for instance, evaporators 48 are also supplied with an outlet connection 74, and condensers 50 include a further outlet connection 76. Evaporator outlet pipes 78 and 80 are coupled to outlet connections on both sides of the evaporators, as well as to outlet connections of adjoining evaporators 82 and 84. Evaporator inlet connection 56 (shown in FIG. 4 for evaporators 84) is connected to evaporator inlet pipe 86, while a similar evaporator inlet connection 88 on the opposite side of the evaporators is connected to an evaporator inlet pipe 90.

Further, condenser outlet connections 62 and 76 are connected respectively to condenser outlet pipes 92 and 94 respectively leading to connections 64. Connections 64 pass through disk 46 such that the condenser outlets are peripherally connected to the evaporator inlets as hereinbefore indicated.

The condenser inlet and the evaporator outlet connections are located at the corners of the respective units closest the center of the present device, while the condenser outlets and the evaporator inlets are located closest the periphery of the device.

Referring again to FIG. 1, evaporator outlet pipes, for example pipes 80 and 96, connect to a bonnet 98 disposed over intake tube 22 of the turbine and provide high pressure gas for operating the turbine. It is noted outlet pipe 96 connects with evaporators 84 and 100. Evaporator 100 and condenser 102 are depicted in schematic fashion at the right-hand side in FIG. 1 for purposes of explanation as will hereinafter more fully appear.

Condenser inlet pipes 104 and 106 communicate, inter alia, with condenser inlet connection 60 of condensers 50 as well as a similarly disposed inlet connection for condenser 102. These and other inlet pipes also communicate with adjacent condensers in the manner described for the evaporator outlet connections, and it is appreciated there are a total of four condenser inlet pipes as well as a total of four evaporator outlet pipes. The condenser inlet pipes are connected to the enclosure 26 via fluid inlet fittings 108 and 110 whereby to receive the turbine exhaust delivered to the interior of enclosure 26 from turbine exhaust ports 112.

A governor 114 is located within bonnet 98 for controlling the gas under pressure delivered to intake tube 22 through apertures 116, and thereby controlling the speed of rotation of the apparatus. (See FIG. 2.) A slide valve cylinder 118 surrounds intake tube 22 and is normally biased downwardly by spring 120 such that apertures 116 are uncovered. Weights 122 pivotally attach to outwardly extending ears 124 at the lower end of the slide valve cylinder and are further provided with cam extensions 126 extending outwardly which cause the slide valve cylinder 118 to move upwardly against the bias of spring 120 when the apparatus rotates, thus partially closing apertures 116. A speed will be achieved at which the apertures are partly closed. In a preferred embodiment, the speed of operation is 1800 rpm for a four pole generator 36,38. Of course, other types of governors and generators may be employed and these are illustrated by way of example.

The enclosure 26 and bonnet 98 as well as surrounding pipes are suitably enclosed by a central cover assembly 130 secured to a center post 132 extending upwardly from bonnet 98, by means of threaded fastener 134. Screened air vents are provided in the sides of the cover assembly, preferably adjacent the evaporators, such that a flow of air takes place in the direction indicated by the arrows, i.e., through the vents 136, past the central annular opening in plate 68 and radially outwardly along the fins of the evaporators when the apparatus rotates. As the apparatus rotates, the fins function as fan blades for producing a substantially radially outward movement of air across the evaporator. Centrifugal force operates on the column of air along the fins and between disk 46 and plate 68.

Rotation of the apparatus also produces the radial movement of air through the annular opening in plate 70 and along the fins of the condensers, with such fins also operating as fan blades, causing the radially outward propulsion of the column of air between the condenser fins and disk 46 and plate 70. At a rotational speed of approximately 1800 rpm, an air speed of approximately 200 mph is produced across each of the evaporators and condensers. It is noted that disk 46 centrally separates the two air passages. A pair of high velocity fans are thus produced for enhancing heat transfer, with the evaporators and condensers themselves acting as fans.

A water pickup device 138 is attached to enclosure 26 just inside the level of the condensers by means of tabs 140. (See FIG. 3.) The water pickup device includes a tubular ring 142 having downwardly and angular inwardly directed pickup tubes 144 extending from at least two sides thereof and communicating with the tubular ring. At the lower extremity of each of each of the pickup tubes is a pickup spout 146 having an opening in its forward portion so that counter-clockwise rotation of the apparatus (as indicated in FIG. 3) forces water 14 from tank 12 into the opening and up tube 144. The angular disposition of the tubes 144, inwardly toward one another, aids in the movement of the water upwardly and outwardly toward ring 142. Ring 142 is provided with a multiplicity of small apertures 148 in the sides thereof adjacent the condensers, and consequently as the apparatus rotates a relatively fine mist is thrown from the apertures 148 toward and across the fins the condensers. This mist is drawn across the condensers by the large volume air flow accomplished by the fan action of the condenser fins. This results in evaporative cooling, dropping the temperature at the condenser by approximately 30° F. as compared with the surrounding air temperature. The rush of air enhances the evaporation.

Considering the overall operation of the device of FIGS. 1–4, the rotation of the device causes movement of the fluid in the evaporators and the condensers toward the periphery of the device by centrifugal force. Thus, as illustrated schematically at the right-hand side of FIG. 1, a column of fluid 150 exists toward the periphery of the condenser 102 balancing a column of fluid 152 in the periphery of the evaporator, through the connection 64 therebetween. It will, of course, be realized the actual column of fluid exists in the tubing of the condenser and evaporator and is shown schematically at the right-hand side of FIG. 1 for purposes of explanation. The fluid is preferably carbon dioxide in liquid form, but may alternatively comprise a refrigerant such as Freon or ammonia.

As the apparatus rotates, the relatively warmer air flowing in large volume across the evaporator warms the fluid and vaporizes the same to the gaseous state producing a relatively high gas pressure in pipe 96 leading to bonnet 98 and the turbine. The heat content of the input ambient air is employed to evaporate the liquid in the evaporator 100. Consequently, the turbine rotates, and expels the gas through exhaust ports 112. Condenser 102 is at a much lower temperature, as hereinbefore described, and condenses the gas leading thereto, e.g. through pipe 106. Thus, the gas is converted back into a liquid. This condensation not only reduces the back pressure against the turbine, but also builds up a column 150 of liquid resisting the back pressure produced in the evaporator 100 and maintaining the flow of the liquid in response to the weight thereof acted upon by centrifugal force. The flow direction is shown by the arrows. In addition to the weight of the liquid 100, it should be noted the vapor in condenser 102 also has considerable weight acting outwardly upon the column of liquid, aiding its condensation and aiding in the flow process.

It is observed that no valving need be employed between the condenser and the evaporator (although a backflow preventing check valve can be included in connection 64 if desired), and no pump is required between the condenser and the evaporator other than as provided by the centrifugal force specifically with respect to the fluid in the rotating condenser. The centrifugal force effectively employs the small area of the condenser to supply a pressure differential causing the flow of fluid radially outwardly and toward the evaporator. A fluid flow of approximately 500 gal./min. takes place, i.e. a relatively high velocity of fluid flow with a relatively low volume of total fluid, enabling a relatively small equipment size minimizing cost. Large amounts of fluid are circulated at high pressures with a high rate of evaporation in the evaporator and a high rate of condensation in the condenser, or in other words a high rate of heat transfer is provided. Very few auxiliary moving parts causing friction losses or the like are present and, in general, friction occurs principally in the turbine bearings which act as the rotational bearings for the entire apparatus. The apparatus is effective in converting a comparatively low-grade heat differential into usable energy for generating electricity or other usable power. The FIG. 1 unit generates approximately 5,000 watts of power.

Carbon dioxide as a fluid has a critical temperature of 88° F. The apparatus is designed to operate so that temperatures at least below that level can be achieved in the condenser by evaporative cooling. The vapor pressure presented to the turbine in the system at 88° F. is approximately 1100 psi.

It should be noted the FIG. 1 device is not self starting. Several alternatives for starting are possible, one of which is to operate generator 36, 38 as a motor for initially driving the apparatus up to speed. A second alternative employed in a specific embodiment utilizes an auxiliary motor and belt drive (not shown) employed only as a starter and then disconnected.

Figure 5:
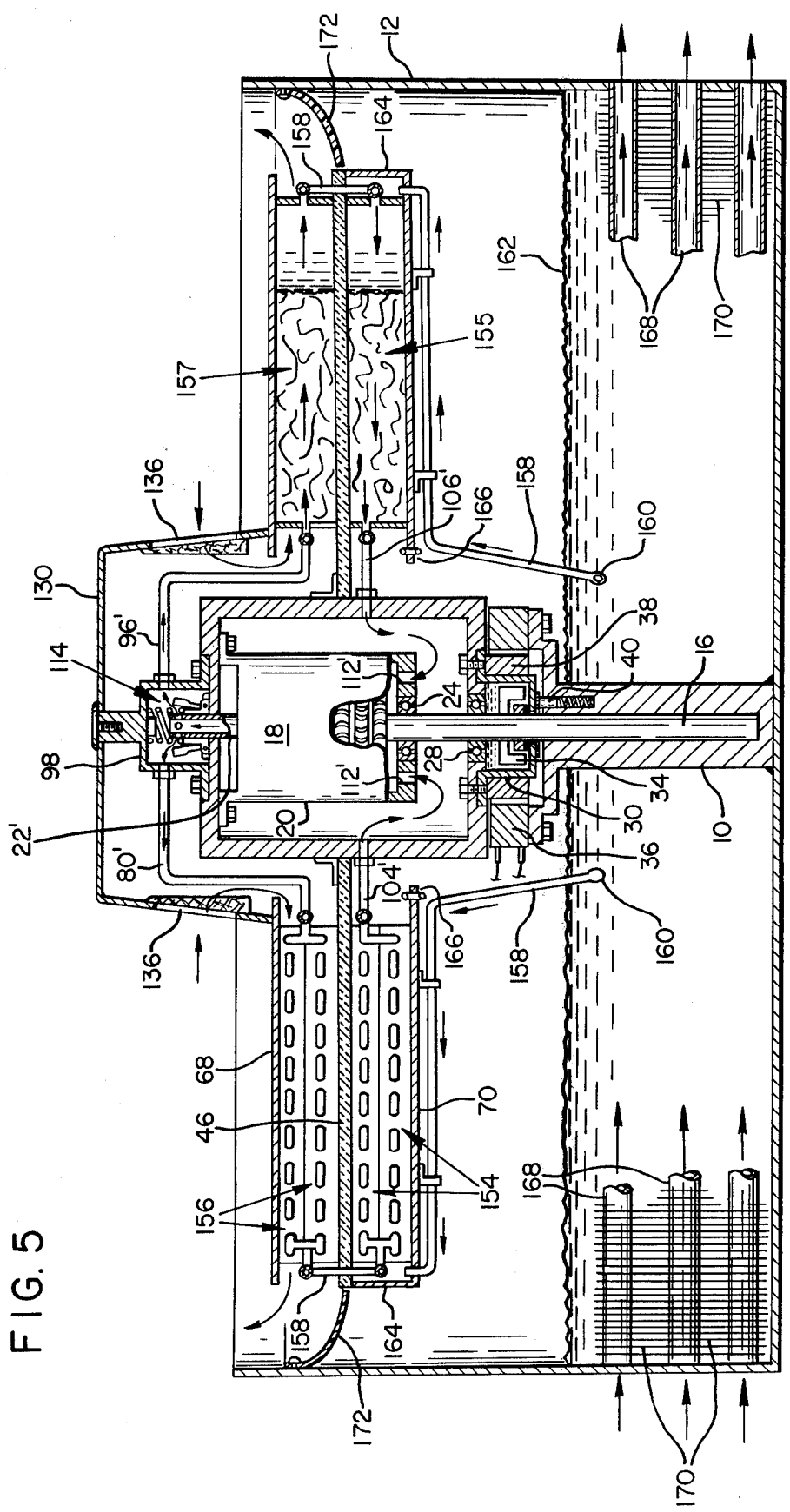
FIG. 5 is a vertical cross-sectional view of a second embodiment according to the present invention.

The apparatus of FIGS. 1–4 operates primarily on the basis of the temperature differential afforded through evaporative cooling of the condenser relative to the temperature of the ambient air. It is readily apparent, however, that the temperature differential can be provided by other means. Thus, the air entering through vents 136 can be artificially heated for raising the temperature differential. A second alternative is illustrated in FIG. 5 wherein a very similar apparatus is depicted and wherein like elements are referenced by like reference numerals. However, the FIG. 5 apparatus is suitable for operation in a lower temperature range, such as below freezing, or where the air temperature is lower than an available water temperature. For example, a source of heated water may be employed. In this device, the condensers are illustrated at 156, 157 and the evaporators are illustrated at 154, 155. The outlet of the condensers communicates to the inlet of the evaporators through peripheral connection 158. In this instance, high pressure gas from the evaporators through pipes 104′, 106′ is delivered to turbine inlet ports 112′ of a turbine 20 and exhausted through tube 22′ leading to pipes 80′ and 96′ connected to bonnet 98. The tubes 80′ and 96′ return the gas to condensers 156 and 157.

Pickup tubes 158 are provided with spouts 160 dipping into solution 162, such as anti-freeze solution, contained in tank 12. The tubes 158 are angled to deliver the solution to closed ends 164 of an enclosure within which the evaporators are located, such enclosure being formed by ends 164 as well as disk 46 and plate 70. Rotation of the apparatus fills up the enclosure around the evaporators with liquid which is returned to the reservoir through overflow tubes 166 located centrally of the plate 70. Water, such as river water or heated water, can be delivered through pipes 168 joined by fins 170 and disposed within the solution in tank 12. The finned pipes collect heat from the water, imparting it to the solution 162, and the pickup tubes 158 supply the thus "heated" solution to the evaporators. This produces evaporation of the fluid within the evaporators, delivering the vapor through pipes 104' and 106' to the turbine. The ambient air flow temperature is in this case below the water temperature, and air passes through vents 136 and condenses the fluid in condensers 156, 157. It is then returned to the evaporators through connection 158. A barrier 172 attached to the periphery of tank 12 adjacent thermal barrier disk 46 aids in separating the low temperature exterior air from the higher temperature solution 162. In this instance, a comparatively low-grade heat differential is again converted into usable energy.

FIGS. 6 and 7 illustrate another embodiment which incorporates some of the same features as the foregoing embodiments, but in a stationary device. Like the just previously described device, this apparatus suitably derives energy from a temperature differential wherein a body of water is utilized as the higher heat reservoir. The whole apparatus of FIG. 6 may then be positioned in such body of water for covering the lower evaporator 174 which is supported from rectangular frame 176 by means not shown. The evaporator 174 delivers a fluid in vapor form through a pipe 178 to a turbine enclosure 180 located in the upper part of the apparatus. The enclosure 180 includes therewithin a turbine 182 driving a generator 184 by means of shaft 186, the turbine having an inlet port 188 and an outlet tube 190 connected to manifold 194. Outlet pipes 196 couple manifold 194 to condensers 198 wherein the fluid circulates in tubing having heat radiating fins attached thereto, and the fluid is then delivered to outlet pipes 200. A pump 202 withdraws liquid from the body of water where the apparatus is supported and delivers water through pipe 204 to a spray nozzle 206 above a condenser unit 198. It is understood the condenser units are suitably continuous around the device, and although the water spray nozzle is illustrated only for the left-hand condenser unit, spray water is similarly delivered to the entire condenser combination. The water evaporates across the fins of condensers 198 causing evaporative cooling and condensation of the fluid within the condensers for delivery through pipes 200 to a first high pressure tank 208.

To aid in operation of the condensers, a fan 244 powered by motor 246 positioned atop manifold 194 directs air flow downwardly and across the condensers 198. This fan can be operated electrically from generator 184, or the turbine, generator shaft may be extended for rotating the same under suitable seal precautions to prevent the escape of high pressure fluid.

Although a water pump 202 is shown as being utilized for delivering water to the nozzle 206, it is understood a supply of water available at a higher level may be employed for this purpose without a pump if so desired. Condenser water is returned via pipe 250.

Tank 208 is the first of three high pressure tanks shown disposed in vertical array and communicating with one another by check valves therebetween, each tank having a capacity of about 500 gallons of fluid such as liquid carbon dioxide. Below tank 208 is a tank 214 communicating with tank 208 by check valve 210, and below tank 214 is a high pressure tank 216 communicating with tank 214 via check valve 212. The bottom tank 216 provides fluid to evaporator 174 through pipes 218 connected to the lower outlet of tank 216.

The type of check valve, e.g. check valve 210, is illustrated schematically in FIG. 6, but is shown in greater detail in FIG. 7 where it is seen a valve poppet 220 is normally spring biased upwardly against a seat 222, but may be forced downwardly by liquid and/or vapor pressure from above.

Each of the tanks is provided with a fluid level indicator such as indicator 224 for tank 208 and indicator 226 for tank 216. However, tank 214 between the other two, is supplied with a somewhat more specialized type of indicator 228 including a floating magnet 230 and proximity switches 232 and 234 located respectively toward upper and lower limits of the fluid level indicator. The proximity switches are connected by conventional wiring to operate solenoid valve 236 having a first position as shown, such that pipe 240 communicates between the top of tank 216 and the top of tank 214. In a second position of the solenoid valve, a pipe 242 connects the upper part of tank 208 with the upper part of tank 214. With the condition of the various valves being as illustrated in FIG. 6, fluid is draining from tank 214 through valve 212 into tank 216. At this time, high pressure vapor within tank 216 exerts a pressure on the underside of valve 210 through pipe 240, keeping valve 210 closed until tank 214 has drained. When the floating magnet 230 has dropped to a position adjacent proximity switch 234, solenoid valve 236 will be operated to its second position and as a consequence higher vapor pressure within tank 216 will no longer reach tank 214, so valve 210 will open. At the same time, valve 212 will be closed by the higher vapor pressure therebelow. The lower vapor pressure above the liquid in tanks 208 and 214 will be coupled through pipe 242, allowing liquid from tank 208 to flow into tank 214. A check valve equalizer 248 is located between pipe 178 and the top of tank 216.

It is seen a gravity feed of liquid continues through the three tanks, but the high back pressure from evaporator 174 is prevented from reaching the turbine or forcing the fluid in the wrong direction. Tank 214 alternately operates under low and high pressure conditions, but allows the escape of very little back pressure to the upper units. Again, as in the prior embodiments, the weight of the fluid is employed for maintaining the flow of the fluid, and no pump is utilized for maintaining this flow whereby efficiency of the device is enhanced. If a conventional pump were needed for causing the flow of fluid through the apparatus, the production of a suitable quantity of energy from the comparatively lowgrade heat differential available in the environment would be doubtful.

Figure 8:
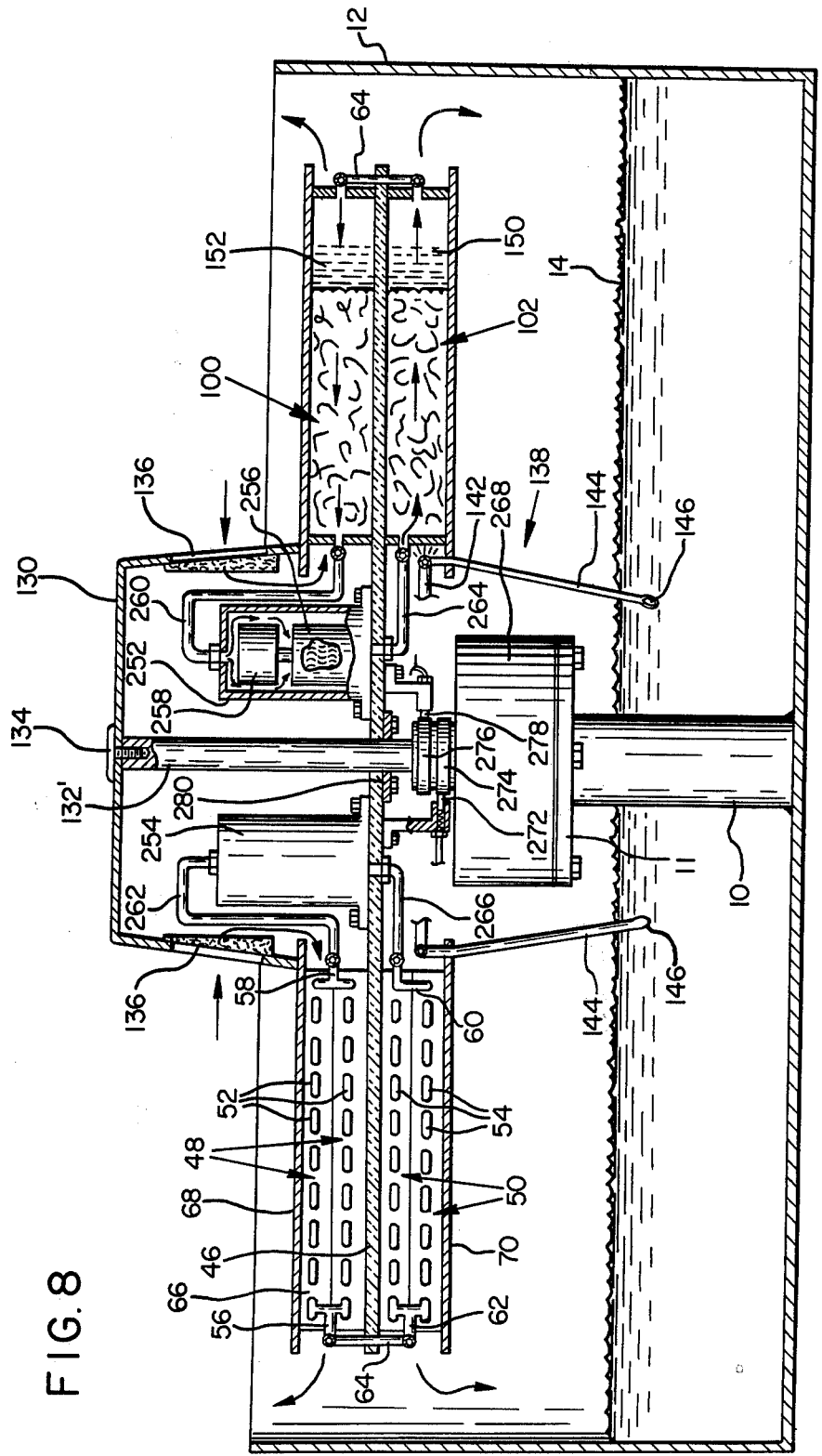
FIG. 8 is a vertical cross-sectional view of a fourth embodiment according to the present invention.

Another preferred embodiment according to the present invention is illustrated in FIG. 8, this embodiment being similar to the apparatus of FIGS. 1-4, wherein like elements are referenced by like reference numerals. In the FIG. 8 apparatus, gas tight turbine enclosures 252 and 254 are supported upon and securely attached to the upper surface of disk 46 beneath central cover assembly 130. Each turbine enclosure includes a small gas turbine 256 having its central shaft connected in driving relation to a generator 258, with the turbine and the generator being securely supported within the enclosure. Evaporator outlet pipes 260 and 262 connect to the respective turbine enclosures and couple high pressure gas thereto for delivery to inlet ports of the respective turbines.

Condenser inlet pipes 264 and 266 receive the exhaust from the respective turbines and extend through disk 46 to communicate with the inlet connections for the various condensers. It should be noted the condenser inlets are all coupled together as in the embodiment of FIGS. 1-4, and moreover the evaporator outlets are similarly connected together. Thus, the turbines are essentially connected in parallel, having common inlet and exhaust. Although two turbine devices are illustrated in FIG. 8, a larger even number such as four such devices can be employed and are in any case symmetrically disposed around center post 132' for balance.

Disk member 46 also supports the tabs of water pickup device 138 wherein such tabs (not shown in FIG. 8) are suitably bent upwards for that purpose.

In the embodiment of FIG. 8, a central cover assembly 130 is peripherally secured to the structure thereunder including disk members 68, 46, and 70, and the intervening evaporators, condensers, etc. Cover assembly 130 is also centrally attached by fastener 134 to the upper end of center post 132', the latter comprising the extended drive shaft of an electric motor 268 mounted upon flange 11 of standard 10. Disk member 46 is inwardly apertured for receiving the center post 132' and is also supportably attached thereto by means of center post flange 280. Consequently, the structure including evaporators, condensers and turbines will turn with the shaft of motor 268.

Brush members 272 and 278 are supported underneath disk 46 and extend downwardly therefrom where they respectively make contact with stationary slip rings 274 and 276 mounted above motor 268. The brushes are respectively coupled via connections not shown to paralleled rotor and stator elements of generators 258 within the respective turbine enclosures, and the slip rings are used to provide excitation to and receive current from these generators. Motor 268 is energized by the aforementioned generators and the output of the apparatus is the excess of power output from generators 258 above that required for operation of motor 268.

Since a motor 268 is employed for rotating the apparatus during operation thereof, the same motor may be employed for initially starting the apparatus. Thus, motor 268 can be initially connected to an outside source of power for bringing the apparatus up to speed, after which motor 268 is switched over to receive power from generators 258.

The FIG. 8 apparatus is substantially the same in operation as the apparatus illustrated in FIGS. 1-4. Thus, as the apparatus rotates, relatively warmer air flowing across the evaporators warms the fluid therewithin and vaporizes the same to a gaseous state producing relatively high pressure at the turbine inlets. The condensers, at a much lower temperature due to evaporative cooling, condense the gaseous exhaust from the turbines back into a liquid. The condensation not only reduces the back pressure against the turbine, but also builds up a column 150 of liquid resisting the back pressure produced in the evaporator 100 and maintaining the flow of liquid in response to the weight thereof acted upon by centrifugal force. No valving or pumping in the conventional manner is required between the condenser and the evaporator.

Although requiring an electric motor for rotation, the apparatus of FIG. 8 exhibits certain advantages in other respects as compared with the embodiment of FIGS. 1-4. The fluid circuit including condensers, evaporators, and turbines is closed and a rotating seal such as the oil seal provided by cup 30 in FIG. 1 is not required. Moreover, the bearing thrust resulting from gas pressure is avoided. A mechanical governor is not required in the system of FIG. 8 since the speed of rotation of motor 68 can be regulated electrically (by conventional means not shown). Efficiency is increased, inter alia, because the working fluid is continuously rotating and therefore doesn't have to be brought up to speed after exhaust from a central turbine device as in the apparatus of FIGS. 1-4. Thus, less energy is expended in moving the fluid itself.

Figure 9:
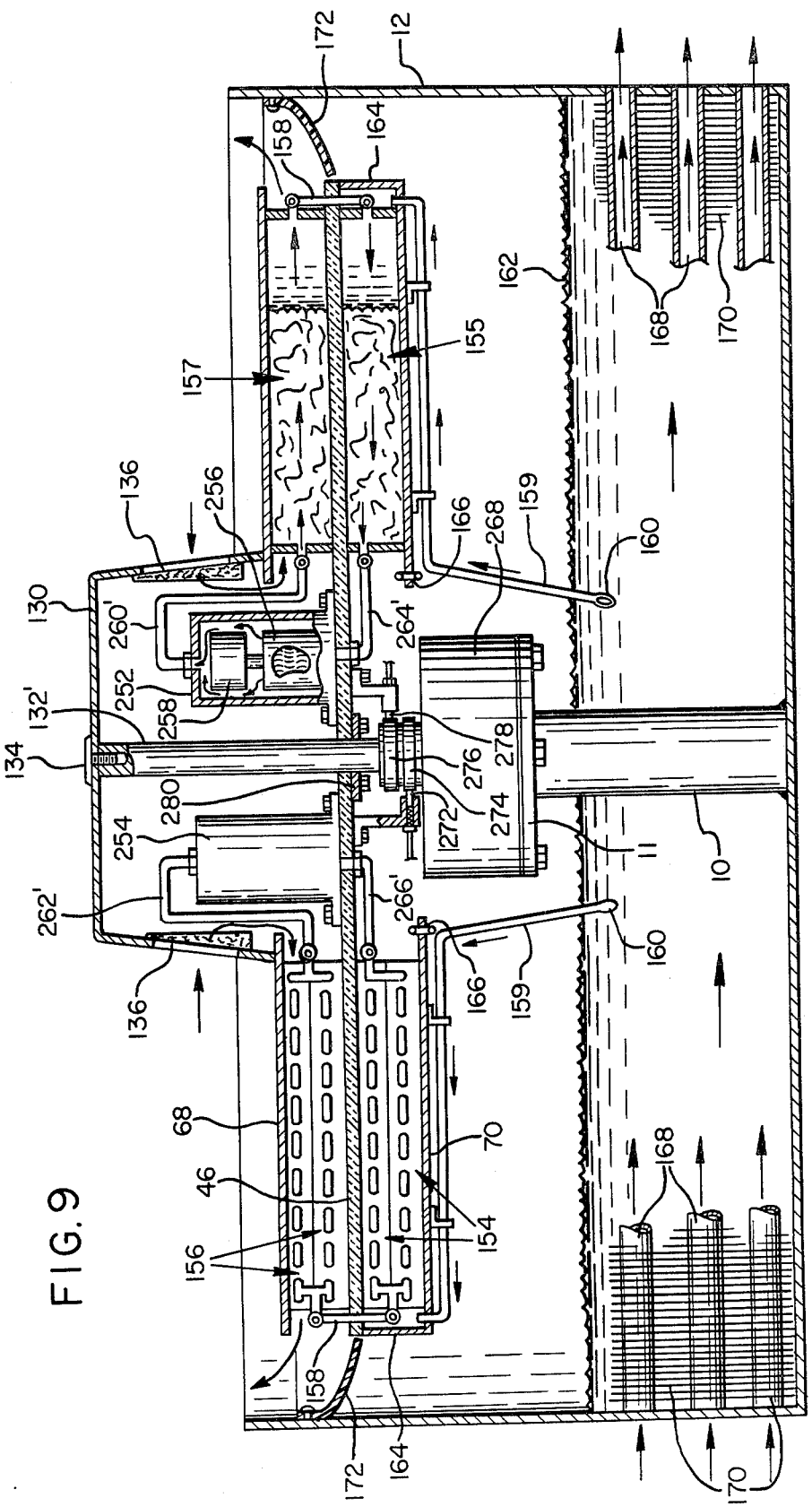
FIG. 9 is a vertical cross-sectional view of a fifth embodiment according to the present invention.

Another apparatus suitable for operation in a lower temperature range, or where the air temperature is lower than an available water temperature, is illustrated in FIG. 9, wherein like elements are referenced by like reference numerals. The construction and operation of the FIG. 9 apparatus are substantially similar to the apparatus depicted in FIG. 8 in that separated turbine enclosures are symmetrically mounted on disk member 46, each including a turbine 256 driving a generator 252, the generators supplying the power for motor 268 as well as the output power of the apparatus. However, in this embodiment the turbines receive high pressure gas via evaporator outlet pipes 264' and 266' which pass through disk member 46. Condenser inlet pipes 260' and 262' receive the turbine exhaust from the interior of the respective turbine enclosures 254 and 258. As in the embodiment of FIG. 5, the condensers 156, 157 are located above disk member 46 and receive the turbine exhaust, while evaporators 154, 155 below disk member 46 are peripherally connected to the condensers as illustrated at 158. The condensed gas in condensers 156, 157 builds up a column of liquid resisting the back pressure produced in the evaporators 154, 155, and maintaining the flow of fluid in response to the weight of the fluid acted upon by centrifugal force. The vaporized fluid from evaporators 154, 155 drives the turbines.

In the embodiment of FIG. 9, as in the embodiment of FIG. 5, pickup tubes 159 withdraw solution 162 from tank 12 and deliver the same at closed ends 164 of an enclosure within which the evaporators are located. Rotation of the apparatus fills up such enclosures around the evaporators with liquid which is returned to the reservoir through overflow tubes 166. Water, such as river water or heated water, can be delivered through pipes 168 joined by fins 170 and disposed within the solution in tank 12. The finned pipes collect heat from the water, imparting it to the solution 162, and the pickup tubes 158 supply the thus "heated" solution to the evaporators. This produces evaporation of the fluid within the evaporators, and delivery of the vapor through pipes 264' and 266' to the turbines. The ambient air flow temperature is below the water temperature, and air passing through vents 136 condenses the fluid in condensers 156, 157. A barrier 172 is attached to the periphery of tank 12 adjacent the thermal barrier disk member 46 and aids in separating the low temperature exterior air from the higher temperature solution 162.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A thermal-cycle engine capable of converting a comparatively low-grade heat differential into usable energy comprising:
   a rotatable member and motor means for rotating the same, a working fluid circuit including a condenser for condensing working fluid from a gas to a liquid and an evaporator for vaporizing said fluid from a liquid to a gas, wherein heat exchanging structure of said condenser is mounted on said rotatable member for carrying said working fluid radially outwardly within said condenser, said motor means causing said condenser to rotate with sufficient speed to provide centrifugal force causing an outward pressure of fluid in said condenser, said structure providing passage of air radially outwardly in intimate contact with heat exchanging surfaces of said condenser, and means connecting said condenser to said evaporator for receiving fluid from said condenser urged outwardly by centrifugal force, said motor means being operable in response to the gaseous output of said evaporator, said condenser employing evaporation cooling including means for depositing water on the exterior of said condenser as the same rotates, wherein said means for depositing water includes a reservoir of water and water pickup means rotating with said condenser for withdrawing water from said reservoir and expelling the same by centrifugal force across said condenser.

2. The apparatus according to claim 1 wherein said evaporator is also mounted on said rotatable member with means being provided for separating said evaporator from said condenser for maintaining a temperature differential therebetween.

3. The apparatus according to claim 1 wherein said motor means comprises a gas turbine.

4. The apparatus according to claim 1 wherein said condenser comprises a plurality of condenser units symmetrically disposed with respect to the axis of said rotatable member.

5. The apparatus according to claim 4 wherein said evaporator is mounted for rotation on said rotatable member, said evaporator comprising a plurality of evaporator units connected to condenser units and disposed symmetrically about the axis of rotation of said rotatable member.

6. The apparatus according to claim 5 wherein said rotatable member comprises a disk rotatable with respect to a central axis, with said condenser and evaporator units being carried on opposite sides of said disk.

7. The apparatus according to claim 6 wherein said motor means is provided with a central shaft defining said central axis.

8. A thermal-cycle engine capable of converting a comparatively low-grade heat differential into usable energy comprising:

a closed working fluid circuit including a condenser for condensing working fluid from a gas to a liquid and an evaporator for vaporizing said fluid from a liquid to a gas, means for applying a temperature differential between said evaporator and said condenser so the temperature of said evaporator is higher than the temperature of said condenser to produce vaporization of said fluid in said evaporator and the condensation of said fluid in said condenser, a motor for receiving gas from said evaporator and in response thereto producing rotary motion, said condenser being mounted for rotary motion with said motor, and means connecting said condenser to said evaporator wherein said rotary motion is of sufficient speed to cause said fluid to be impelled outwardly by centrifugal force resulting in a pressure urging said fluid from said condenser through said closed circuit toward said evaporator against the pressure on said fluid caused by evaporation, said condenser employing evaporation cooling and including means for depositing water on the exterior of said condenser, and wherein the fins of said condenser are disposed as fan blades for producing a substantially radially outward movement of air across said condenser.

9. The apparatus according to claim 8 wherein said evaporator is also mounted for rotation with said motor for connection with said condenser.

10. The apparatus according to claim 8 wherein said means for depositing water on the exterior of said condenser includes a reservoir of water and water pickup means rotating with said condenser for withdrawing water from said reservoir and expelling the same by centrifugal force across said condenser.

11. The apparatus according to claim 8 including a thermal barrier between said evaporator and said condenser and between air passages leading to said evaporator and said condenser.

12. The apparatus according to claim 8 including an electrical generator rotated by said motor.

13. The apparatus according to claim 12 wherein the rotor of said generator is secured to the exterior of said motor for rotation therewith.

14. A thermal-cycle engine capable of converting a comparatively low-grade heat differential into usable energy comprising:

a closed working fluid circuit including a condenser for condensing working fluid from a gas to a liquid and an evaporator for vaporizing said fluid from a liquid to a gas, means for applying a temperature differential between said evaporator and said condenser so the temperature of said evaporator is higher than the temperature of said condenser to produce vaporization of said fluid in said evaporator and the condensation of said fluid in said condenser, a motor for receiving gas from said evaporator and in response thereto producing rotary motion, said condenser being mounted for rotary motion with said motor, said evaporator being mounted for rotary motion with said motor and for connection with said condenser, and means connecting said condenser to said evaporator wherein said rotary motion is of sufficient speed to cause said fluid to be impelled outwardly by centrifugal force resulting in a pressure urging said fluid from said condenser through said closed circuit toward said evaporator against the pressure on said fluid caused by evaporation, wherein the fins of said evaporator are disposed as fan blades for producing a substantially radially outward movement of air across said evaporator.

15. The apparatus according to claim 14 wherein the fins of said condenser are disposed as fan blades for producing a substantially radially outward movement of air across said condenser.

16. A thermal-cycle engine capable of converting a comparatively low-grade heat differential into usable energy comprising:

a closed working fluid circuit including a condenser for condensing working fluid from a gas to a liquid and an evaporator for vaporizing said fluid from a liquid to a gas, said condenser being connected to said evaporator for coupling condensed fluid from said condenser into said evaporator, means for applying a temperature differential between said evaporator and said condenser so the temperature of said evaporator is higher than the temperature of said condenser to provide vaporization of said fluid in said evaporator and condensation of said fluid in said condenser, said condenser, including a connection to said evaporator, being mounted for rotation for impelling fluid within said condenser radially outwardly toward said connection as the weight of said fluid is acted upon by centrifugal force, resulting in a pressure in said closed circuit urging said fluid from said condenser toward said evaporator against the pressure on said fluid caused by evaporation in said evaporator, and means responsive to the high pressure gaseous output of said evaporator to provide rotation of said condenser at sufficient speed to produce outward pressure of the fluid in said condenser by centrifugal force, wherein said condenser comprises a plurality of condenser units symmetrically disposed with respect to the axis of rotation of said condenser, and wherein said evaporator is mounted for rotation with said condenser, said evaporator comprising a plurality of evaporator units connected to condenser units and disposed symmetrically about the axis of rotation of said condenser, with individual condenser units and evaporator units located on different sides of said axis of rotation.

17. The apparatus according to claim 16 wherein the fins of said condenser are disposed as fan blades for producing a substantially radially outward movement of air across said condenser, and wherein said condenser employs evaporation cooling including means for depositing water on the exterior of said condenser.

18. The apparatus according to claim 17 wherein said means for depositing water on the exterior of said condenser includes a reservoir of water and water pickup means rotating with said condenser for withdrawing water from said reservoir and expelling the same by centrifugal force across said condenser.

19. The apparatus according to claim 16 wherein said evaporator is also mounted for rotation with said condenser.

20. The apparatus according to claim 16 including a thermal barrier between said evaporator and said condenser and between air passages leading to said evaporator and to said condenser.

21. The apparatus according to claim 16 wherein said means responsive to the high pressure gaseous output of said evaporator comprises a motor for receiving gas from said evaporator and in response thereto producing rotation of said condenser.

22. The apparatus according to claim 21 wherein the shaft of said motor is stationarily positioned on a support with the exterior of said motor rotating about its shaft on the shaft bearing, said condenser and said evaporator being secured to the exterior of said motor for rotation therewith.

23. The apparatus according to claim 22 wherein said motor comprises a gas turbine.

24. The apparatus according to claim 16 including an electrical generator rotated by said means responsive to the high pressure gaseous output of said evaporator.

25. The apparatus according to claim 16 wherein the fins of said evaporator are disposed as fan blades for producing a substantially radially outward movement of air across said evaporator.

26. A thermal-cycle engine capable of converting a comparatively low-grade heat differential into usable energy comprising:

a rotatable member provided with motor means for rotating the same, a working fluid circuit including a condenser for condensing working fluid from a gas to a liquid and an evaporator for vaporizing said working fluid from a liquid to a gas, said condenser being mounted on said rotatable member and comprising a structure of condenser elements comprising re-entrant tubing of serpentine configuration defining a multiplicity of working fluid paths wherein adjacent passes of said tubing are substantially circumferential of said rotatable member but are progressively further outwardly in a radial direction within which said working fluid is urged radially outwardly, said motor means causing said condenser to rotate with sufficient speed to provide centrifugal force causing an outward pressure of fluid in said condenser, the condenser structure including airflow paths between condenser elements comprising said tubing for providing passage of air across said condenser elements comprising said tubing in intimate heat exchanging relation therewith, and means connecting said condenser to said evaporator for receiving said working fluid carried outwardly by pressure in said condenser as said condenser rotates and coupling the same to said evaporator.

27. The apparatus according to claim 26 wherein said evaporator is also mounted on said rotatable member, and including means for separating said evaporator from said condenser to maintain a temperature differential therebetween.

28. The apparatus according to claim 26 wherein said condenser employs evaporation cooling including means for depositing water on the exterior of said condenser as the same rotates.

* * * * *

UNITED STATES PATENT AND TRADEMARK OFFICE
CERTIFICATE OF CORRECTION

PATENT NO. : 4,307,573

DATED : December 29, 1981

INVENTOR(S) : WILLIAM L. KING

It is certified that error appears in the above—identified patent and that said Letters Patent is hereby corrected as shown below:

Col. 1, line 42, the word --energy-- should have been after "usable" and before "wherein".

Col. 1, line 53, "eveporators" should have been --evaporators--.

Col. 5, line 14, the word --of-- should have been after "fins" and before "the".

Signed and Sealed this

Eighteenth Day of May 1982

[SEAL]

Attest:

Attesting Officer

GERALD J. MOSSINGHOFF

Commissioner of Patents and Trademarks